(12) United States Patent
Angus et al.

(10) Patent No.: US 8,806,579 B1
(45) Date of Patent: Aug. 12, 2014

(54) SECURE PARTITIONING OF DEVICES CONNECTED TO AIRCRAFT NETWORK DATA PROCESSING SYSTEMS

(75) Inventors: Ian Gareth Angus, Mercer Island, WA (US); Steven Craig Venema, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 13/271,871

(22) Filed: Oct. 12, 2011

(51) Int. Cl.
*H04L 29/06* (2006.01)
*G06F 15/16* (2006.01)
*G06F 21/62* (2013.01)
*G06F 9/50* (2006.01)

(52) U.S. Cl.
CPC .......... *G06F 21/6218* (2013.01); *G06F 9/5061* (2013.01)
USPC .................................. 726/4; 726/1; 701/29.1

(58) Field of Classification Search
None
See application file for complete search history.

(56) References Cited

U.S. PATENT DOCUMENTS

| | | | |
|---|---|---|---|
| 6,671,589 B2 | 12/2003 | Holst et al. | |
| 6,868,319 B2 | 3/2005 | Kipersztok et al. | |
| 7,840,812 B1 | 11/2010 | Levenberg | |
| 8,055,393 B2 | 11/2011 | Sims, III et al. | |
| 8,132,233 B2 * | 3/2012 | Gronholm et al. | 726/3 |
| 8,185,609 B2 | 5/2012 | Fuchs et al. | |
| 8,286,174 B1 | 10/2012 | Schmidt et al. | |
| 8,341,747 B2 | 12/2012 | Cornwall et al. | |
| 8,370,647 B2 | 2/2013 | Kitani | |
| 8,458,695 B2 | 6/2013 | Fitzgerald et al. | |
| 8,522,237 B2 | 8/2013 | Hotra | |
| 8,572,613 B1 | 10/2013 | Brandwine | |
| 8,589,020 B1 | 11/2013 | Angus et al. | |
| 8,615,384 B2 | 12/2013 | Angus et al. | |
| 2003/0187878 A1 | 10/2003 | Sandifer | |
| 2006/0020782 A1 | 1/2006 | Kakii | |
| 2006/0080497 A1* | 4/2006 | Boning | 711/103 |
| 2006/0080519 A1* | 4/2006 | Boning | 711/163 |
| 2006/0090053 A1* | 4/2006 | Boning | 711/163 |
| 2006/0106836 A1 | 5/2006 | Masugi et al. | |
| 2006/0112246 A1* | 5/2006 | Boning | 711/163 |
| 2006/0229772 A1 | 10/2006 | McClary | |
| 2008/0184225 A1 | 7/2008 | Fitzgerald et al. | |
| 2009/0077626 A1* | 3/2009 | Leclercq et al. | 726/1 |
| 2009/0112569 A1 | 4/2009 | Angus et al. | |
| 2009/0138873 A1 | 5/2009 | Beck et al. | |
| 2009/0138874 A1 | 5/2009 | Beck et al. | |
| 2009/0150022 A1 | 6/2009 | McMillin et al. | |
| 2009/0187976 A1 | 7/2009 | Perroud et al. | |
| 2009/0198393 A1 | 8/2009 | Sims, III et al. | |

(Continued)

OTHER PUBLICATIONS

Non-final office action dated Mar. 1, 2013 regarding U.S. Appl. No. 13/306,528, 19 pages.

(Continued)

*Primary Examiner* — Christopher Revak
(74) *Attorney, Agent, or Firm* — Yee & Associates, P.C.

(57) ABSTRACT

A system and method for controlling access to an aircraft network data processing system on an aircraft. A first operating environment on a data processing device is configured to access the aircraft network data processing system. A second operating environment on the data processing device is configured to request access to the aircraft network data processing system. A network access controller on the first operating environment is configured to control the access to the aircraft network data processing system by the second operating environment based on rules defining the access to the aircraft network data processing system.

20 Claims, 5 Drawing Sheets

(56) References Cited

U.S. PATENT DOCUMENTS

| | | | |
|---|---|---|---|
| 2009/0260006 | A1 | 10/2009 | Hotra |
| 2010/0100887 | A1 | 4/2010 | Beltrand |
| 2010/0122343 | A1 | 5/2010 | Ghosh et al. |
| 2010/0161805 | A1 | 6/2010 | Yoshizawa et al. |
| 2010/0299742 | A1 | 11/2010 | Declety et al. |
| 2011/0004676 | A1 | 1/2011 | Kawato |
| 2011/0071709 | A1* | 3/2011 | Damiani et al. ........... 701/3 |
| 2011/0173605 | A1 | 7/2011 | Bourne |
| 2011/0219373 | A1* | 9/2011 | Nam et al. ............ 718/1 |
| 2012/0131637 | A1* | 5/2012 | Lum et al. ............ 726/1 |
| 2012/0246698 | A1* | 9/2012 | Lum et al. ............ 726/1 |
| 2012/0254937 | A1* | 10/2012 | Lum et al. ............ 726/1 |
| 2012/0254938 | A1* | 10/2012 | Lum et al. ............ 726/1 |
| 2012/0254939 | A1* | 10/2012 | Lum et al. ............ 726/1 |
| 2013/0031543 | A1 | 1/2013 | Angus et al. |
| 2013/0305391 | A1* | 11/2013 | Haukom et al. ........... 726/29 |

OTHER PUBLICATIONS

Non-final office action dated Apr. 16, 2013 regarding U.S. Appl. No. 13/246,610, 15 pages.

"TCG Trusted Network Connect TNC Architecture for Interoperability", Trusted Computing Group Incorporated, Specification V. 1.4, Rev. 4, May 2009, 45 pages.

"HAP Technology Overview: Trusted Computing Technologies Used in the High Assurance Platform", National Security Agency/Central Security Service, Jan. 2011, 1 page.

U.S. Appl. No. 13/246,610, filed Sep. 27, 2011, Angus et al.

U.S. Appl. No. 13/306,528, filed Nov. 29, 2011, Angus et al.

Notice of allowance dated Jul. 31, 2013 regarding U.S. Appl. No. 13/306,528, 12 pages.

Non-final office action dated Dec. 16, 2013 regarding U.S. Appl. No. 13/190,184, 31 pages.

Final office action dated Oct. 11, 2013 regarding U.S. Appl. No. 13/246,610, 12 pages.

Combined Search and Examination Report, dated Oct. 24, 2012, regarding Application No. GB1211743.8, 6 pages.

Subar, "Mobile virtualization finds its home in the enterprise," Tech News and Analsyis, Jun. 25, 2011, 13 pages.

"What is Mobile Virtualization?," Open Kernal Labs, 2 pages. http://www.ok-labs.com/solutions/what-is-mobile-phone-virtualization.

Uk examination report dated Nov. 7, 2013 regarding application GB1211743.8, reference NAMM/P123215GB00, applicant The Boeing Company, 4 pages.

Notice of allowance dated Feb. 21, 2014 regarding U.S. Appl. No. 13/190,184, 24 pages.

Office Action dated Apr. 10, 2014 regarding U.S. Appl. No. 13/246,610, 16 pages.

* cited by examiner

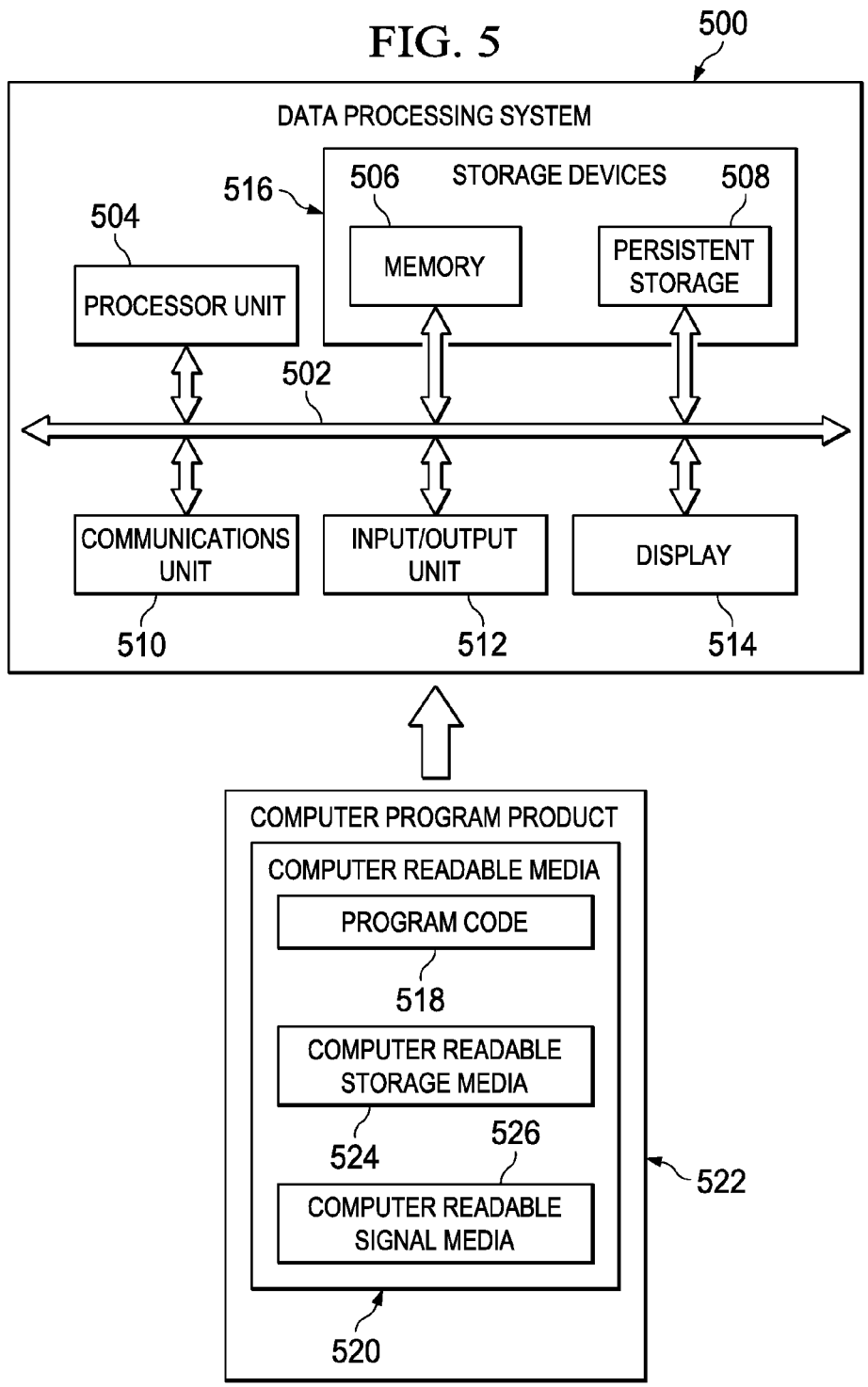

SECURE PARTITIONING OF DEVICES CONNECTED TO AIRCRAFT NETWORK DATA PROCESSING SYSTEMS

BACKGROUND INFORMATION

1. Field

The present disclosure relates generally to portable data processing devices, such as maintenance devices, that may be connected to network data processing systems on aircraft. Still more particularly, the present disclosure relates to partitioning the data processing resources on such a device into separate operating environments, wherein an application on one of the operating environments controls access by the other operating environments to the aircraft network data processing system.

2. Background

Modern aircraft are extremely complex. For example, an aircraft may have many types of electronic systems on-board. These systems are often in the form of line-replaceable units (LRUs). A line-replaceable unit is an item that can be removed from an aircraft and replaced. A line-replaceable unit is designed to be easily replaceable.

A line-replaceable unit may take on various forms. A line-replaceable unit on an aircraft may be, for example, without limitation, a flight management system, an autopilot, an in-flight entertainment system, a communications system, a navigation system, a flight controller, a flight recorder, a collision avoidance system, a system to support maintenance functions, a system to support crew processes, or a system to provide other operations and functions or combinations of operations and functions. The various line-replaceable units on an aircraft may be parts of an aircraft network data processing system.

Line-replaceable units may use software or programming to provide the logic or control for various operations and functions. Typically, all software on an aircraft is treated as a separate part, or is combined with a hardware part and is unchangeable without changing the hardware part number. Aircraft software that is treated as an aircraft part may be referred to as a loadable software aircraft part or a software aircraft part. Software aircraft parts are parts of an aircraft's configuration.

Aircraft operators are entities that operate aircraft. Aircraft operators also may be responsible for the maintenance of aircraft. Examples of aircraft operators include, without limitation, airlines and military units. When an aircraft operator receives an aircraft, software aircraft parts may be already installed in the line-replaceable units on the aircraft.

An aircraft operator may also receive copies of loaded software aircraft parts in case the parts need to be reinstalled or reloaded into the line-replaceable units on the aircraft. Reloading of software aircraft parts may be required, for example, if a line-replaceable unit in which the software is used is replaced. Further, the aircraft operator also may receive updates to the software aircraft parts from time to time. These updates may include additional features not present in the currently-installed software aircraft parts and may be considered upgrades to one or more line-replaceable units. Specified procedures may be followed during loading of a software aircraft part on an aircraft so that the current configuration of the aircraft, including all of the software aircraft parts loaded on the aircraft, is known.

An aircraft operator, or other aircraft maintenance entity, may perform maintenance operations on an aircraft. Some maintenance operations may be performed by connecting a maintenance device to the network data processing system on the aircraft. For example, the maintenance device may be a portable computing device, such as a laptop computer.

The maintenance device may include software stored on the device that is used to perform various maintenance operations on the aircraft. The maintenance device may also include other software stored on the device. It is desired that only maintenance devices from approved maintenance entities, including only approved software from trusted software suppliers, be allowed to access the aircraft network data processing system. For example, unapproved software on a maintenance device may include software that is corrupted, software that is infected with a virus, or other unapproved software. Unapproved software may affect the operation of the aircraft network data processing system in undesired ways if a maintenance device containing such software is allowed to access the aircraft network data processing system.

Current systems and methods for controlling access to entirely ground-based computer networks may not be applied effectively to mobile systems, such as aircraft. The particular environment in which aircraft network data processing systems are operated and maintained makes it difficult or impossible to use current network access control systems and methods to control the access of maintenance devices or other devices to an aircraft network data processing system. This is due partly to the fact that aircraft are often disconnected from other networks and partly to the conventions for aircraft configuration control that are followed in aircraft maintenance operations.

Accordingly, it would be advantageous to have a method and apparatus that takes into account one or more of the issues discussed above as well as possibly other issues.

SUMMARY

An embodiment of the present disclosure provides an apparatus comprising a first operating environment on a data processing device. The first operating environment is configured to access an aircraft network data processing system on an aircraft. A second operating environment on the data processing device is configured to request access to the aircraft network data processing system. A network access controller on the first operating environment is configured to control the access to the aircraft network data processing system by the second operating environment based on rules defining the access to the aircraft network data processing system.

Another embodiment of the present disclosure provides a method for accessing an aircraft network data processing system on an aircraft. A first operating environment on a data processing device connected to the aircraft network data processing system accesses the aircraft network data processing system. A second operating environment on the data processing device requests access to the aircraft network data processing system. A network access controller on the first operating environment controls the access to the aircraft network data processing system by the second operating environment based on rules defining the access to the aircraft network data processing system.

Another embodiment of the present disclosure provides a method for changing software on a data processing device. A first operating environment on the data processing device identifies update software in a designated location for the update software in a second operating environment on the data processing device. The first operating environment changes the software in the first operating environment using the update software in response to identifying the update software in the second operating environment.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of advantageous embodiments of the present disclosure when read in conjunction with the accompanying drawings, wherein:

FIG. 5 is an illustration of a data processing system in accordance with an advantageous embodiment.

DETAILED DESCRIPTION

Figure 1:
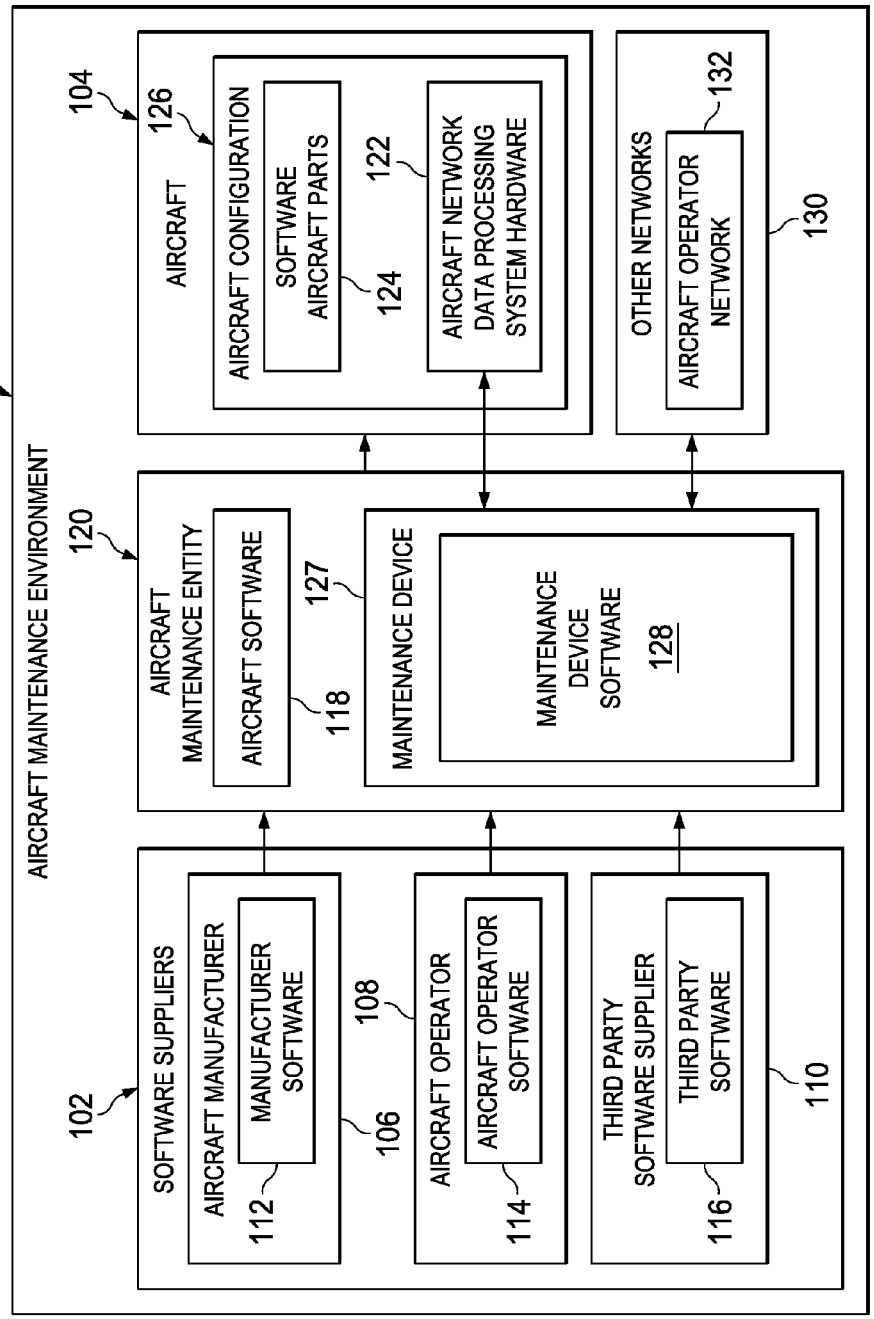
FIG. 1 is an illustration of a block diagram of an aircraft maintenance environment for maintaining an aircraft in accordance with an advantageous embodiment.

The different advantageous embodiments recognize and take into account a number of different considerations. "A number", as used herein with reference to items, means one or more items. For example, "a number of different considerations" means one or more different considerations.

The different advantageous embodiments recognize and take into account that an aircraft manufacturer desires to control the configuration of data processing devices that may be connected to an aircraft network data processing system on an aircraft. For example, the aircraft manufacturer may desire a portable maintenance device to contain applications provided by the aircraft manufacturer for performing privileged avionics level maintenance operations on an aircraft. Aircraft manufacturers may be concerned that other software on such a maintenance device may affect aircraft operations in unknown or undesired ways if the device is connected to the aircraft network data processing system.

The different advantageous embodiments also recognize and take into account that an aircraft operator also may desire to connect a data processing device to the aircraft network data processing system to perform various maintenance operations. The aircraft operator may desire flexibility in using such a data processing device within the operator's information technology system. For example, the aircraft operator may desire to connect a portable aircraft maintenance device to the operator's back-office information technology networks or to other networks. Furthermore, the operator may desire to store and use operator applications on such a maintenance device.

The different advantageous embodiments also recognize and take into account that it is desirable to have a portable maintenance device that may be used to connect to aircraft network data processing systems for a variety of different aircraft. However, different aircraft models may require different configurations for the maintenance device.

The different advantageous embodiments also recognize and take into account that currently, portable aircraft maintenance devices are easily connected to a variety of computer networks. As a result, such devices may be exposed to undesired software, such as malware. Therefore, a portable aircraft maintenance device may provide a vehicle for exposing an aircraft to such undesired software when the device is connected to an aircraft network data processing system.

The different advantageous embodiments also recognize and take into account that current aircraft security procedures treat data processing devices that are capable of connecting to the aircraft network data processing system as trusted. Currently, an aircraft cannot validate the correct configuration of a device connected to the aircraft network data processing system. Currently, any device with physical or wireless access and the appropriate interface and authentication protocols may be able to connect to the aircraft network data processing system via a wired or wireless connection.

The different advantageous embodiments also recognize and take into account that a portable aircraft maintenance device may contain all of the credentials needed to connect to an aircraft network data processing system. If the maintenance device is stolen, the credentials also are stolen. In this case, an unauthorized entity may gain access to an aircraft network data processing system with unapproved software using the stolen device or stolen credentials.

Thus, one or more of the advantageous embodiments provides a system and method for controlling access to an aircraft network data processing system by a data processing device that may be connected to the aircraft network data processing system. Data processing resources on the data processing device are separated into a first operating environment and a number of second operating environments. The first operating environment is configured to access the aircraft network data processing system. The number of second operating environments may request access to the aircraft network data processing system. A network access controller on the first operating environment is configured to control access to the aircraft network data processing system based on rules defining access to the aircraft network data processing system.

In accordance with an advantageous embodiment, the first operating environment, including the rules defining access to the aircraft network data processing system, may be controlled by an aircraft manufacturer. The number of second operating environments may be used by an aircraft operator or other entity. Unapproved software that may be loaded in the second operating environments is prevented from affecting the aircraft by the separation between the first operating environment and the second operating environments and by the control of access to the aircraft network data processing system provided by the network access controller on the first operating environment.

Turning now to FIG. 1, an illustration of a block diagram of an aircraft maintenance environment for maintaining an aircraft is depicted in accordance with an advantageous embodiment. In this example, aircraft maintenance environment 100 may include software suppliers 102. Software suppliers 102 provide software applications or other software for use on aircraft 104. Software suppliers 102 may include any entity that develops or otherwise supplies software for use on aircraft 104. For example, without limitation, software suppliers 102 may include aircraft manufacturer 106, aircraft operator 108, and third party software supplier 110.

Aircraft manufacturer 106 manufactures aircraft 104 and provides manufacturer software 112. Aircraft operator 108 operates aircraft 104 and provides aircraft operator software 114. Aircraft operator 108 may be, for example, without limitation, an airline, military organization, or any other private or government organization that operates aircraft 104. Third party software supplier 110 provides third party software 116. Manufacturer software 112, aircraft operator software 114, and third party software 116 may form parts of aircraft software 118 for use on aircraft 104.

Aircraft maintenance entity 120 in aircraft maintenance environment 100 may load aircraft software 118 on aircraft 104. Aircraft maintenance entity 120 may be any entity that is responsible for loading aircraft software 118 on aircraft 104. For example, aircraft maintenance entity 120 may include aircraft manufacturer 106 or aircraft operator 108. Aircraft maintenance entity 120 may or may not be the owner of aircraft 104. Aircraft maintenance entity 120 may include an entity acting on behalf of the owner of aircraft 104 to load aircraft software 118 on aircraft 104. In any case, it is assumed that aircraft maintenance entity 120 has authority to load aircraft software 118 on aircraft 104.

Aircraft 104 may be a commercial or private passenger aircraft, cargo aircraft, or a military or other government aircraft. Aircraft 104 may include aircraft network data processing system hardware 122. Aircraft software 118 may be loaded onto aircraft 104 in the form of software aircraft parts 124. Aircraft network data processing system hardware 122 and software aircraft parts 124 together define aircraft configuration 126. Software aircraft parts 124 may be loaded onto aircraft 104 by aircraft maintenance entity 120. Aircraft maintenance entity 120 may follow specified procedures for loading of software aircraft parts 124 on aircraft 104 so that aircraft configuration 126, including all of software aircraft parts 124 currently installed on aircraft 104, is known.

Software aircraft parts 124 may be run on aircraft network data processing system hardware 122 to perform various operations. These operations may affect the performance or safety of aircraft 104. Operations performed using software aircraft parts 124 that are not specifically designed for aircraft 104 or that are not approved for use on aircraft 104 may affect aircraft 104 in an undesired manner.

Aircraft maintenance entity 120 may maintain aircraft 104 using maintenance device 127. Aircraft maintenance entity 120 that loads aircraft software 118 on aircraft 104 may or may not be the same as aircraft maintenance entity 120 that maintains aircraft 104 using maintenance device 127. In any case, it is assumed that aircraft maintenance entity 120 has authority to access aircraft network data processing system hardware 122 using maintenance device 127 to perform maintenance operations on aircraft 104.

Maintenance device 127 may be a portable data processing device that is connected to aircraft network data processing system hardware 122 on aircraft 104 to perform various maintenance operations on aircraft 104. For example, without limitation, maintenance device 127 may be a laptop computer, other portable computer, or some other type of portable data processing device that may be connected to aircraft network data processing system hardware 122 via a wired or wireless connection.

Maintenance device 127 includes maintenance device software 128. Maintenance device software 128 may include software for controlling maintenance device 127 to perform various maintenance operations on aircraft 104, as well as other software. Maintenance device software 128 may include software that is provided from one or more of software suppliers 102. For example, maintenance device software 128 may include one or more of manufacturer software 112, aircraft operator software 114, or third party software 116.

Maintenance device software 128 may be changed by updates from one or more of software suppliers 102. Changes to maintenance device software 128 by updates from software suppliers 102 that are trusted should not affect operations on aircraft 104 in an undesired manner.

Maintenance device software 128 also may be changed in undesired ways. For example, maintenance device software 128 may become corrupted, infected, or otherwise changed in an undesired manner. In this case, such software may affect operations on aircraft 104 in an undesired manner if maintenance device 127 is connected to aircraft network data processing system hardware 122 on aircraft 104.

Aircraft maintenance entity 120 or another entity also may connect maintenance device 127 to other networks 130. For example, without limitation, other networks 130 may include aircraft operator network 132. Maintenance device software 128 may be changed in undesired ways when maintenance device 127 is connected to other networks 130.

Figure 2:
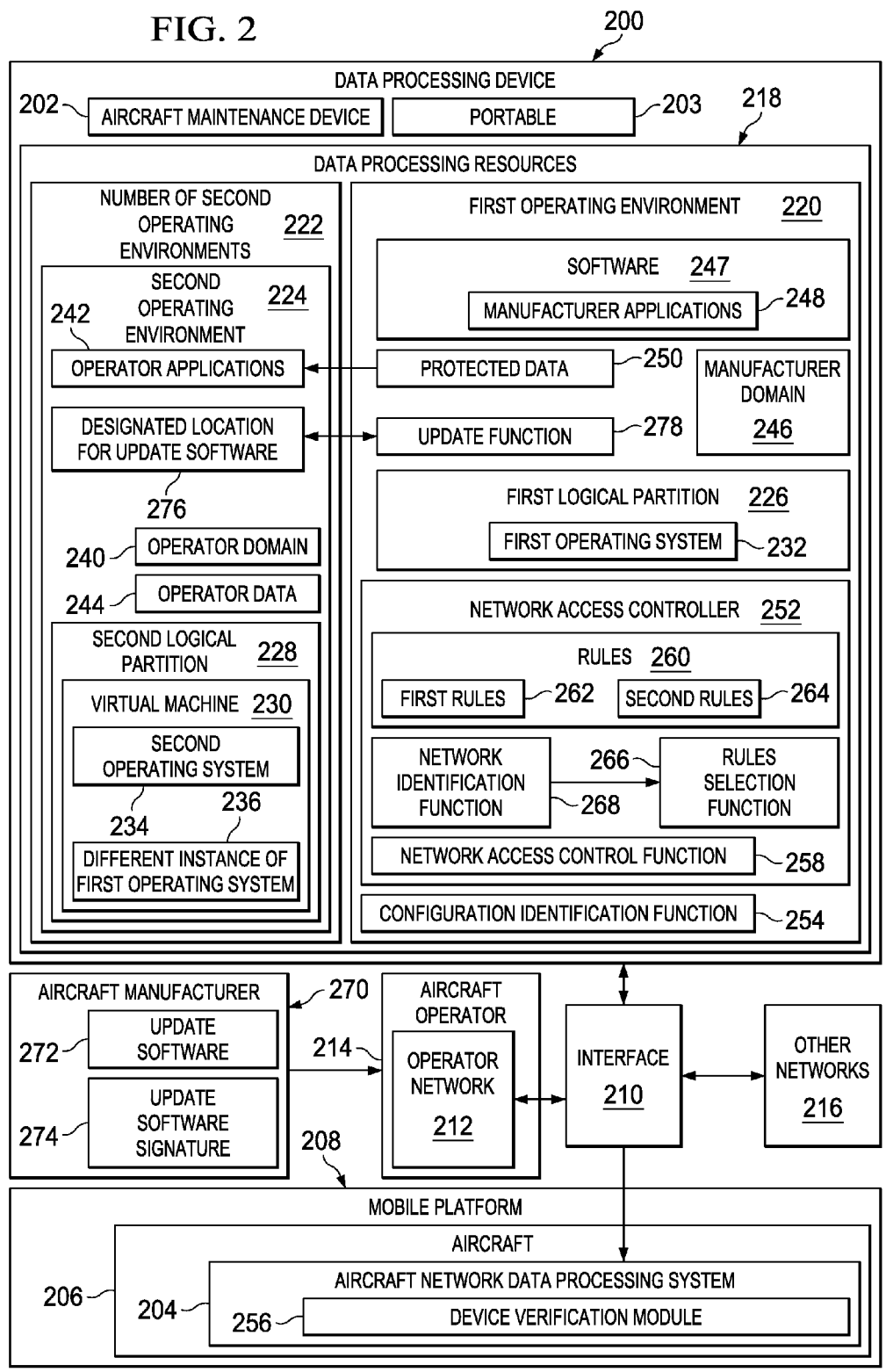
FIG. 2 is an illustration of a block diagram of a data processing device connected to an aircraft network data processing system in accordance with an advantageous embodiment.

Turning now to FIG. 2, an illustration of a block diagram of a data processing device connected to an aircraft network data processing system is depicted in accordance with an advantageous embodiment. Data processing device 200 may be aircraft maintenance device 202. In this example, data processing device 200 is an example of one implementation of maintenance device 127 in FIG. 1. Data processing device 200 may be portable 203. For example, without limitation, data processing device 200 may be a laptop computer, other portable computer, or another type of portable data processing device.

Data processing device 200 is configured to be connected to aircraft network data processing system 204 on aircraft 206. For example, without limitation, aircraft network data processing system 204 may include a number of line-replaceable units. In this example, aircraft 206 is an example of one implementation of aircraft 104 in FIG. 1.

Aircraft 206 is one example of mobile platform 208 in which an advantageous embodiment may be implemented. Mobile platform 208 may be another type of vehicle or other mobile structure. For example, without limitation, mobile platform 208 may be an aerospace vehicle that is capable of traveling through the air, in space, or both. As another example, without limitation, mobile platform 208 may be a vehicle that is capable of traveling on land, on the surface of water, or underwater.

Data processing device 200 is configured to be connected to aircraft network data processing system 204 on aircraft 206 via interface 210. Interface 210 may be implemented in any known manner for providing an exchange of data or information between data processing device 200 and aircraft network data processing system 204 using any transmission medium and any protocol. Interface 210 may provide a physical connection, such as an electric wire or fiber optic connection. Alternatively, interface 210 may provide a wireless connection. Interface 210 may include hardware, software, or a combination of the two operating together to provide the connection between data processing device 200 and aircraft network data processing system 204. Interface 210 may be implemented, at least in part, as part of data processing device 200. For example, without limitation, interface 210 may provide an Ethernet or similar type of connection between data processing device 200 and aircraft network data processing system 204 on aircraft 206.

Data processing device 200 also may be connected to operator network 212 via interface 210. Operator network 212 may be a computer network operated by aircraft operator 214. Aircraft operator 214 may be, for example, without limitation, an airline, military organization, or any other private or government organization that operates aircraft 206. Aircraft operator 214 also may be an aircraft maintenance entity, such as aircraft maintenance entity 120 in FIG. 1. For example, aircraft operator 214 may use data processing device 200 for maintaining aircraft 206 by connecting data processing device 200 to aircraft network data processing system 204.

Data processing device 200 also may be connected to other networks 216 via interface 210. For example, without limitation, other networks 216 may include the Internet. Data processing device 200 may be connected to other networks 216 by aircraft operator 214 or by another entity.

Data processing device 200 includes data processing resources 218. Data processing resources 218 may include various hardware, firmware, and software components that may be used by applications running on data processing device 200 to perform various operations.

In accordance with an advantageous embodiment, first operating environment 220 and number of second operating environments 222 are implemented in data processing resources 218. Second operating environment 224 is an example, without limitation, of one of number of second operating environments 222.

First operating environment 220 and number of second operating environments 222 are implemented to provide isolation between applications in first operating environment 220 and applications in number of second operating environments 222. The desired isolation between first operating environment 220 and number of second operating environments 222 may be implemented and enforced using any appropriate method or technique.

For example, without limitation, first operating environment 220 may include first logical partition 226 of data processing resources 218 and second operating environment 224 may include second logical partition 228 of data processing resources 218. First operating environment 220 may include first operating system 232. First operating system 232 may be a host operating system. Second operating environment 224 may be implemented as virtual machine 230 managed by first operating system 232. Virtual machine 230 may run applications on second operating system 234. Second operating system 234 may be a different operating system from first operating system 232. Alternatively, virtual machine 230 may be implemented using different instance of first operating system 236. Different instances of the same operating system may be used to implement a container virtualization technique to provide the desired isolation between first operating environment 220 and second operating environment 224.

First operating environment 220 may be manufacturer domain 246. In this case, first operating environment 220 may be used and controlled by aircraft manufacturer 270. First operating environment 220 may include software 247 that is run in first operating environment 220. Software 247 may include manufacturer applications 248. Manufacturer applications 248 may employ protected data 250 to perform desired operations. For example, without limitation, manufacturer applications 248 may include software for controlling data processing device 200 to perform a number of maintenance operations on aircraft 206 when data processing device 200 is connected to aircraft network data processing system 204.

Second operating environment 224 may be operator domain 240. In this case, aircraft operator 214 may use second operating environment 224 to store and run operator applications 242. Operator applications 242 may use operator data 244 to perform various operations. In some cases, operator applications 242 may be allowed to use protected data 250 from first operating environment 220 to perform various operations. However, operator applications 242 preferably are not allowed to change protected data 250 in first operating environment 220. The operations performed by operator applications 242 may or may not be related to maintenance or operation of aircraft 206. For example, without limitation, aircraft operator 214 may load operator applications 242 and operator data 244 into second operating environment 224 from operator network 212 or from another source by connecting data processing device 200 to operator network 212 or to other networks 216.

Number of second operating environments 222 may include other operator domains for aircraft operator 214. Number of second operating environments 222 may include operating environments for use by one or more other entities. In any case, number of second operating environments 222 may include operating environments that are implemented in a different manner to perform different operations than second operating environment 224.

First operating environment 220 may be configured to access aircraft network data processing system 204, operator network 212, and other networks 216. For example, software 247 in first operating environment 220 may include software applications for accessing aircraft network data processing system 204, operator network 212, and other networks 216 via interface 210.

Number of second operating environments 222 may request access to aircraft network data processing system 204, operator network 212, or other networks 216. For example, without limitation, second operating environment 224 may request access to aircraft network data processing system 204 when data processing device 200 is connected to aircraft network data processing system 204. In accordance with an advantageous embodiment, all access by number of second operating environments 222 to any network is controlled by network access controller 252 in first operating environment 220.

Network access controller 252 may be implemented in hardware, software, or a combination of hardware and software in first operating environment 220. Network access controller 252 includes network access control function 258 for controlling access by number of second operating environments 222 to aircraft network data processing system 204, operator network 212, and other networks 216. In accordance with an advantageous embodiment, network access control function 258 controls access by number of second operating environments 222 to aircraft network data processing system 204, operator network 212, and other networks 216 based on rules 260. Rules 260 may define limits on access to aircraft network data processing system 204, operator network 212, and other networks 216 by number of second operating environments 222.

For example, without limitation, second operating environment 224 may request access to aircraft network data processing system 204 when data processing device 200 is connected to aircraft network data processing system 204. In this case, network access control function 258 may control access by second operating environment 224 to aircraft network data processing system 204 based on first rules 262. First rules 262 may define access to aircraft network data processing system 204 by second operating environment 224. Since any access to aircraft network data processing system 204 may affect operation of aircraft 206, first rules 262 may be provided exclusively by aircraft manufacturer 270. Alternatively, first rules 262 may include rules provided by one or more other entities or by one or more other entities in combination with aircraft manufacturer 270.

Second operating environment 224 also may request access to operator network 212 or other networks 216. In this case, network access control function 258 may control access by second operating environment 224 to operator network 212 or other networks 216 based on second rules 264. Second rules 264 may define access to operator network 212 or to other networks 216 by second operating environment 224. Second rules 264 may include rules provided by aircraft manufacturer 270, or by aircraft manufacturer 270 and aircraft operator 214 or another entity. Preferably, any second rules 264 provided by aircraft operator 214 or another entity may only further restrict the access to operator network 212 or other networks 216 as defined by second rules 264 provided by aircraft manufacturer 270. In other words, preferably any second rules 264 provided by aircraft operator 214 or another entity may not allow access to operator network 212 or to other networks 216 that would not be allowed by second rules 264 provided by aircraft manufacturer 270.

Network access controller 252 may employ rules selection function 266 to select which of rules 260 will be used by network access control function 258 to control access by number of second operating environments 222 to a network. Rules selection function 266 may select one or more of rules 260 based on the identity of one or more networks to which data processing device 200 is connected. Network access controller 252 may employ network identification function 268 to identify one or more networks to which data processing device 200 is connected. If a network to which data processing device 200 is connected cannot be identified, then a default set of rules 260 may be used to control access to the network.

For example, without limitation, network identification function 268 may identify the model and operator of aircraft 206 when data processing device 200 is connected to aircraft network data processing system 204. In one example, without limitation, network identification function 268 may query standard airplane parameters on aircraft network data processing system 204 to identify the model and operator of aircraft 206 or may identify the model and operator of aircraft 206 in some other manner. Rules selection function 266 then may select rules 260 defining access to aircraft network data processing system 204 based on the model and operator of aircraft 206 as identified by network identification function 268. Data processing device 200 thus may be used to access aircraft network data processing systems on different models of aircraft operated by different operators. Specific rules 260 for controlling access to the aircraft network data processing systems on the different models of aircraft may be selected and applied automatically by network access controller 252.

Configuration identification function 254 may be implemented in first operating environment 220. Configuration identification function 254 may be used to identify data processing device 200 to aircraft network data processing system 204 when data processing device 200 is initially connected to aircraft network data processing system 204. Configuration identification function 254 may operate in combination with device verification module 256 on aircraft network data processing system 204 to verify that data processing device 200 is allowed to access aircraft network data processing system 204.

For example, without limitation, configuration identification function 254 and device verification module 256 may be used to determine whether to grant access by data processing device 200 to aircraft network data processing system 204 using the architecture and standards for Trusted Network Connect (TNC) developed by the Trusted Computing Group (TCG). Using this architecture, for example, configuration identification function 254 may be used for integrity measurement and remote attestation. Configuration identification function 254 may measure the software on data processing device 200 using a number of hash functions. The measurements may be stored securely in a Trusted Platform Module on data processing device 200. During a Trusted Network Connect handshake, these measurements may be sent to device verification module 256 on aircraft 206, where they are compared against the values for approved configurations. If the values do not match, then access by data processing device 200 to aircraft network data processing system 204 may be denied. If the values do match, then access by data processing device 200 to aircraft network data processing system 204 may be allowed.

In accordance with an advantageous embodiment, data processing device 200 may be connected to aircraft network data processing system 204 on aircraft 206 via interface 210. Initially, access to aircraft network data processing system 204 by data processing device 200 is prevented until it is determined whether data processing device 200 is allowed to access aircraft network data processing system 204. For purposes of the present application, including in the claims, the limited connectivity and interaction between data processing device 200 and aircraft network data processing system 204 needed to determine whether data processing device 200 is allowed to access aircraft network data processing system 204 is not considered "access". Until it is determined whether data processing device 200 is allowed to access aircraft network data processing system 204, connectivity and interaction between data processing device 200 and aircraft network data processing system 204 on aircraft 206 is limited so that any unapproved software on data processing device 200 cannot affect aircraft network data processing system 204 in any way.

Having established a connection between data processing device 200 and aircraft network data processing system 204, data processing device 200 may request access to aircraft network data processing system 204. Data processing device 200 sends the measurement generated by configuration identification function 254 to aircraft network data processing system 204 on aircraft 206. This information may be sent to aircraft network data processing system 204 from data processing device 200 along with the request to access aircraft network data processing system 204 on aircraft 206. Alternatively, this information may be sent to aircraft network data processing system 204 from data processing device 200 in response to a request for such information that is sent from aircraft network data processing system 204 on aircraft 206 to data processing device 200 in response to aircraft network data processing system 204 receiving the request to access aircraft network data processing system 204 from data processing device 200.

In accordance with an advantageous embodiment, device verification module 256 on aircraft 206 uses the measurement provided by configuration identification function 254 to determine whether data processing device 200 is allowed to access aircraft network data processing system 204 on aircraft 206. Device verification module 256 may be configured to allow access to aircraft network data processing system 204 by data processing device 200 if the measurement sent from data processing device 200 matches an expected measurement for data processing device 200. Device verification module 256 may deny access to aircraft network data processing system 204 by data processing device 200 if the measurement sent from data processing device 200 does not match the expected measurement for data processing device 200.

The different advantageous embodiments recognize and take into account that aircraft operator 214 or other entities may change the software on data processing device 200. Aircraft operator 214 or other entities may change the software on data processing device 200 often and for various reasons. As long as the changes to the software on data processing device 200 are approved changes from a trusted source, the changes should not prevent data processing device 200 from accessing aircraft network data processing system 204.

The different advantageous embodiments also recognize and take into account that changes to the software on data processing device 200 may change the value of the actual measurement of the software on data processing device 200 as determined by configuration identification function 254. If the expected measurement used by device verification module 256 on aircraft 206 does not reflect the latest updates to the software on data processing device 200, then the expected measurement will not match the actual measurement. In this case, data processing device 200 may not be allowed to access aircraft network data processing system 204, even though the changes to the software on data processing device 200 are approved software from trusted sources.

The different advantageous embodiments recognize and take into account that the environment in which aircraft network data processing system 204 on aircraft 206 is operated and maintained may make it difficult for a data processing system on aircraft 206 to obtain and store the latest expected measurements of software, including the latest updates, on data processing devices that may request access to aircraft network data processing system 204. For example, a network data processing system on mobile platform 208, such as aircraft 206, is often disconnected from access to other computer networks. Therefore, a data processing system on aircraft 206 may not be able to obtain the latest expected measurement of software on data processing device 200 requesting access to aircraft network data processing system 204 directly from a trusted third party via a network connection when needed.

The different advantageous embodiments also recognize and take into account that the latest expected measurement of software on data processing device 200 may be loaded onto aircraft 206 and stored in aircraft network data processing system 204 each time the software on data processing device 200 is changed. However, new expected measurements that are loaded and stored on aircraft 206 may be subject to the procedures that are followed during loading of a software aircraft part on aircraft 206 so that the current configuration of aircraft 206 is always known. It may be unwieldy and inefficient to update the configuration of aircraft 206 in this manner for every software change to any device that may legitimately request access to aircraft network data processing system 204.

One solution to this challenge is to send both an actual measurement of the software on the device attempting to access aircraft network data processing system 204 and an expected measurement of the software on the device obtained from a trusted source from the device to aircraft 206 when the device requests access to aircraft network data processing system 204. In this case, aircraft network data processing system 204 need not have prior knowledge of the expected measurement of the software on the device or immediate access to a third party source of such information in order to determine whether or not the device should be allowed to access aircraft network data processing system 204. This solution is described in more detail in U.S. patent application Ser. No. 13/246,610, entitled "Verification of Devices Connected to Aircraft Data Processing Systems", filed on Sep. 27, 2011, and assigned to the assignee of the present application, the details of which are incorporated herein by reference.

The configuration measurement that is sent to aircraft 206 to determine whether data processing device 200 is allowed to access aircraft network data processing system 204 may be based only on software 247 in first operating environment 220. For example, information regarding a configuration of software 247 in first operating environment 220 may be identified by configuration identification function 254 by applying one or more hash functions or other functions to software 247 in first operating environment 220. This information then may be sent to device verification module 256 on aircraft 206. Device verification module 256 then may compare this information to an expected measurement of software 247 in first operating environment 220 to determine whether data processing device 200 is allowed to access aircraft network data processing system 204.

By basing device verification only on the configuration of software 247 in first operating environment 220, frequent changes to software 247 in number of second operating environments 222, by aircraft operator 214 or other entities, will not affect whether or not access to aircraft network data processing system 204 by data processing device 200 will be allowed. Changes to software 247 in first operating environment 220 may still require a new expected measurement for software 247 to be sent to or obtained by device verification module 256 on aircraft 206. However, changes to software 247 in first operating environment 220, controlled by aircraft manufacturer 270, are likely to be less frequent.

Aircraft manufacturer 270 or another entity may provide update software 272 for data processing device 200. Update software 272 may be any software that is used to change or replace software 247 in first operating environment 220 on data processing device 200. For example, without limitation, update software 272 may include software to change or replace manufacturer applications 248 on data processing device 200. In accordance with an advantageous embodiment, update software 272 from aircraft manufacturer 270 may be distributed to data processing device 200 by aircraft operator 214 or another entity using processes similar to those used by aircraft operator 214 or another entity to load other software on number of second operating environments 222 in data processing device 200. However, in accordance with an advantageous embodiment, actual changes to software 247 in first operating environment 220 using update software 272 may be controlled by an application in first operating environment 220.

In accordance with an advantageous embodiment, update software 272 and update software signature 274 may be provided by aircraft manufacturer 270 to aircraft operator 214 or another entity for distribution to data processing device 200. Update software signature 274 may be a digital signature that indicates the source of update software 272. Update software signature 274 may be used to determine whether update software 272 is from a trusted or approved source before update software 272 is used to change software 247 in first operating environment 220 on data processing device 200.

Update software 272 and update software signature 274 may be loaded by aircraft operator 214 or another entity into one or more of number of second operating environments 222 on data processing device 200. For example, update software 272 and update software signature 274 may be loaded into second operating environment 224 by aircraft operator 214 or another entity via operator network 212, other networks 216, or in another manner. Update software 272 and update software signature 274 loaded in second operating environment 224 may be stored in designated location for update software 276 in second operating environment 224. For example, without limitation, designated location for update software 276 may be a designated portion of persistent storage in second operating environment 224.

At an appropriate time, update function 278 in first operating environment 220 may identify the presence of update software 272 and update software signature 274 in designated location for update software 276 in second operating environment 224. For example, without limitation, update function 278 may check for the presence of update software 272 and update software signature 274 in designated location for update software 276 when data processing device 200 is rebooted or at any other appropriate time. In response to identifying update software 272 and update software signature 274 in designated location for update software 276, update software 272 and update software signature 274 may be retrieved by update function 278 in first operating environment 220 from designated location for update software 276 in second operating environment 224. Update function 278 may use update software signature 274 to verify that update software 272 is approved software from a trusted source. If update software 272 is determined to be approved software from a trusted source, then update function 278 in first operating environment 220 may change software 247 in first operating environment 220 using update software 272.

The illustration of FIG. 2 is not meant to imply physical or architectural limitations to the manner in which different advantageous embodiments may be implemented. Other components in addition to, in place of, or both in addition to and in place of the ones illustrated may be used. Some components may be unnecessary in some advantageous embodiments. Also, the blocks are presented to illustrate some functional components. One or more of these blocks may be combined or divided into different blocks when implemented in different advantageous embodiments.

Figure 3:
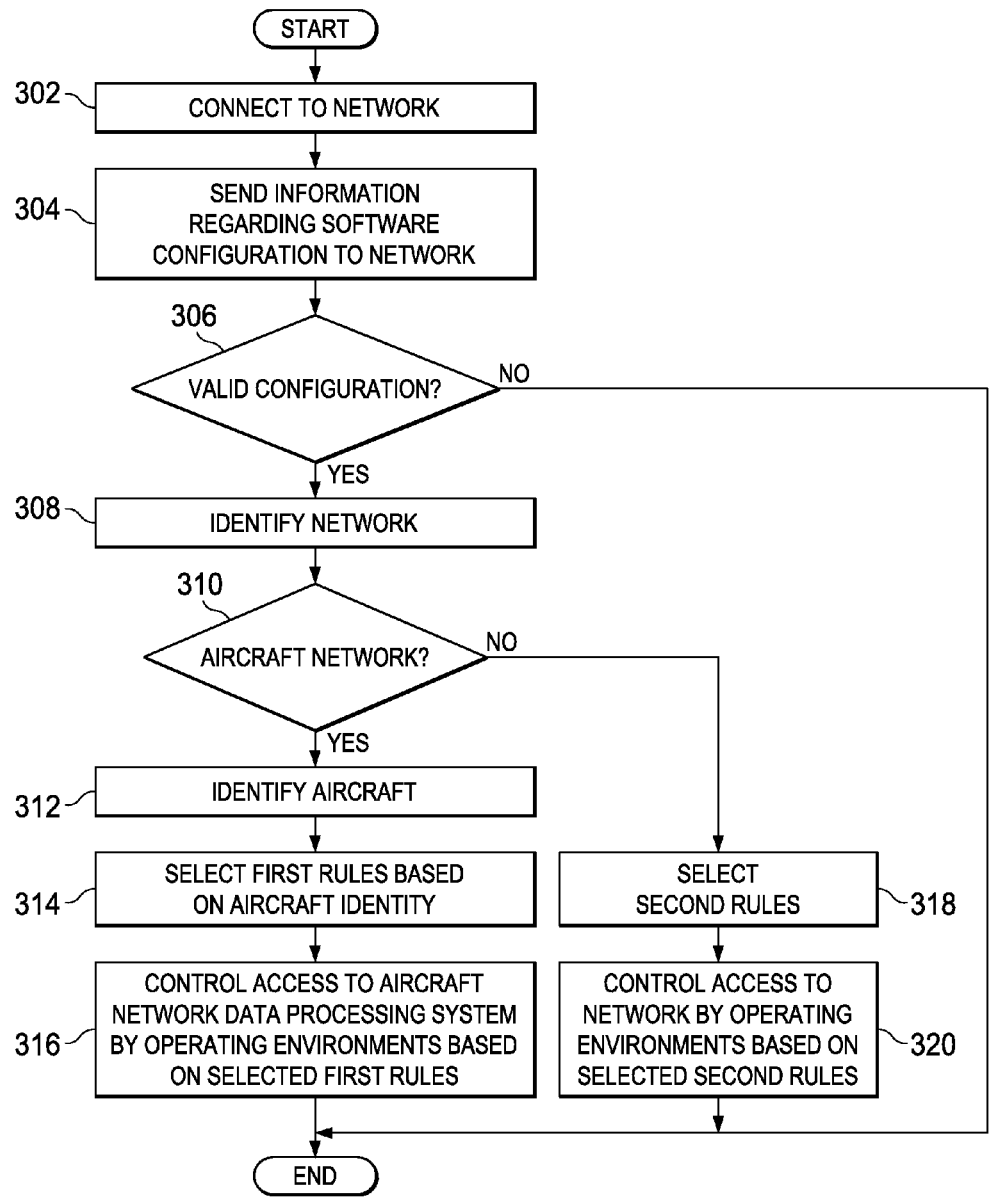
FIG. 3 is an illustration of a flowchart of a process for accessing an aircraft network data processing system by a data processing device in accordance with an advantageous embodiment.

Turning now to FIG. 3, an illustration of a flowchart of a process for accessing an aircraft network data processing system on an aircraft by a data processing device is depicted in accordance with an advantageous embodiment. For example, the process of FIG. 3 may be performed by data processing device 200 in FIG. 2 to access aircraft network data processing system 204 on aircraft 206 in FIG. 2.

The data processing device first connects to a network (operation 302). For example, operation 302 may include connecting the data processing device to an aircraft network data processing system on an aircraft. Information regarding the software configuration of the device may be sent to the network (operation 304). For example, without limitation, information regarding a configuration of the software in only a manufacturer domain or other operating environment on the data processing device may be sent to the network. The information sent to the network may be used to determine whether the data processing device has a valid configuration (operation 306). If it is determined at operation 306 that the data processing device does not have a valid configuration, then access by the data processing device to the network may not be allowed and the process terminates thereafter.

If it is determined at operation 306 that the data processing device does have a valid configuration, then access to the network may be allowed. The network to which the date processing device is connected then may be identified (operation 308). It may be determined whether the identified network to which the data processing device is connected is an aircraft network (operation 310). If it is determined that the network to which the data processing device is connected is an aircraft network, the aircraft may be identified (operation 312). For example, without limitation, operation 312 may include identifying a model and operator of the aircraft to which the data processing device is connected. First rules then may be selected based on the aircraft identity (operation 314). The first rules may define access to the aircraft network data processing system on the aircraft. Access to the aircraft network data processing system by operating environments on the data processing device are controlled based on the selected first rules (operation 316) with the process terminating thereafter. For example, without limitation, operation 316 may include controlling access by a number of operating environments on the data processing device to the aircraft network data processing system by a network access controller on another operating environment on the data processing device based on the first rules.

If it is determined at operation 310 that the network to which the data processing device is connected is not an aircraft network, then second rules may be selected (operation 318). The second rules may define access to the network to which the data processing device is connected. Access to the network by the operating environments on the data processing device then may be controlled based on the selected second rules (operation 320) with the process terminating thereafter. For example, without limitation, operation 320 may include controlling access by a number of operating environments on the data processing device to the network by a network access controller on another operating environment on the data processing device based on the second rules.

Figure 4:
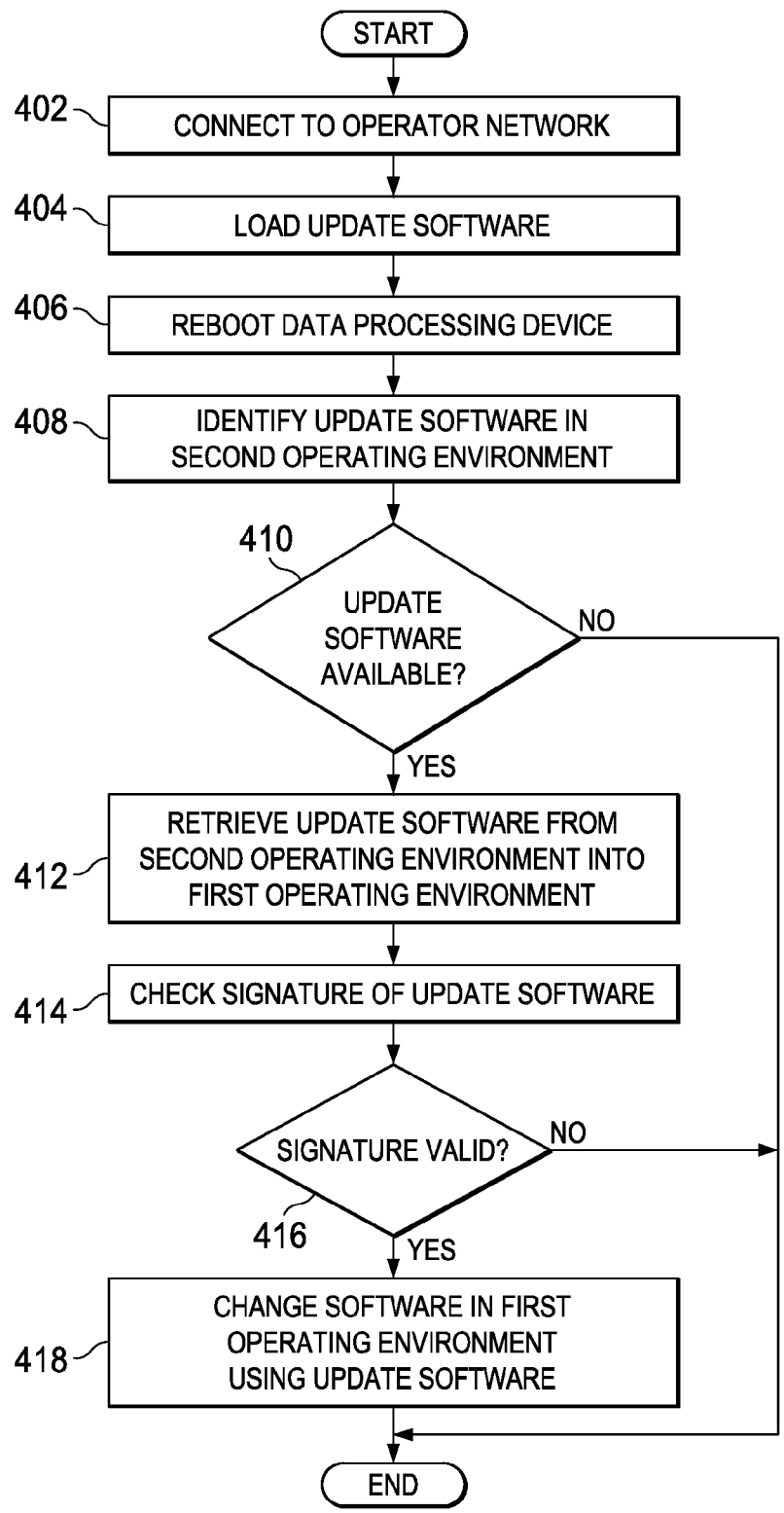
FIG. 4 is an illustration of a flowchart of a process for changing software on a data processing device in accordance with an advantageous embodiment.

Turning now to FIG. 4, an illustration of a flowchart of a process for changing software on a data processing device is depicted in accordance with an advantageous embodiment. For example, the process of FIG. 4 may be performed by data processing device 200 in FIG. 2 to change software 247 in first operating environment 220. This process allows update software for changing the software in a manufacturer domain or other operating environment on the data processing device to be distributed to the data processing device by an aircraft operator or other entity. However, actual changing of the software in the manufacturer domain or other operating environment using the update software is controlled by the manufacturer domain or other operating environment.

The process may begin by connecting the data processing device to an operator network (operation 402). Update software then may be loaded from the operator network into an operating environment on the data processing device to which the operator has access (operation 404). For example, operation 404 may include loading the update software into a designated location for update software in the operating environment on the data processing device to which the operator has access. Operation 404 also may include loading an update software signature for the update software into the operating environment on the data processing device to which the operator has access. At some time after loading the update software on the data processing device, the data processing device may be rebooted (operation 406).

In response to rebooting the data processing device, a first operating environment on the data processing device having software to be changed identifies the update software in the second operating environment on the data processing device into which the update software was loaded (operation 408). It is then determined whether update software is available in the second operating environment for changing the software in the first operating environment (operation 410). If it is determined at operation 410 that update software for changing the software in the first operating environment is not available, then the process for changing the software on the data processing device may terminate.

If it is determined at operation 410 that update software is available in the second operating environment for changing the software in the first operating environment, the update software may be retrieved from the second operating environment into the first operating environment (operation 412). The update software signature then may be checked (operation 414) to determine whether or not the update software is approved software from a trusted source. It is then determined whether or not the update software signature is valid (operation 416). If it is determined that the update software signature is not valid, then the update software is not used to change the software in the first operating environment and the process for changing the software on the data processing device may terminate. If it is determined that the update software signature is valid, then the software in the first operating environment may be changed using the update software (operation 418), with the process terminating thereafter.

Turning now to FIG. 5, an illustration of a data processing system is depicted in accordance with an advantageous embodiment. In this example, data processing system 500 is an example of one implementation of data processing device 200 in FIG. 2. In this illustrative example, data processing system 500 includes communications fabric 502. Communications fabric 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications fabric 502.

Processor unit 504 serves to run instructions for software that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another advantageous example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis. Storage devices 516 also may be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these advantageous examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another advantageous example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as found in an interface and memory controller hub that may be present in communications fabric 502.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a first operating environment on a single data processing device configured to access an aircraft network data processing system on an aircraft, wherein the first operating environment comprises a first logical partition comprising an operating system;
a second operating environment on the single data processing device configured to request access to the aircraft network data processing system, wherein the second operating environment comprises a second logical partition comprising a virtual machine;
a network access controller on the first operating environment configured to control the access to the aircraft network data processing system by the second operating environment based on rules defining the access to the aircraft network data processing system; and
a separation between the first operating environment and the second operating environment preventing the second operating environment from affecting the aircraft except when controlled by the network access controller.

2. The apparatus of claim 1, wherein the rules defining the access to the aircraft network data processing system are provided by a manufacturer of the aircraft.

3. The apparatus of claim 1, wherein:
the first operating environment is configured to access an other network;
the second operating environment is configured to request access to the other network; and
the network access controller on the first operating environment is configured to control the access by the second operating environment to the other network based on rules defining the access to the other network.

4. The apparatus of claim 3, wherein the rules defining the access to the other network include rules provided by a manufacturer of the aircraft and rules provided by an other operator of the aircraft different from the manufacturer of the aircraft.

5. The apparatus of claim 1, wherein the network access controller is further configured to:
identify the aircraft to which the single data processing device is connected; and
select the rules defining the access to the aircraft network data processing system based on an identity of the aircraft to which the single data processing device is connected.

6. The apparatus of claim 1, wherein the first operating environment is further configured to provide information regarding a configuration of software on the first operating environment to the aircraft network data processing system to identify the single data processing device as a first device that is allowed to connect to the aircraft network data processing system, wherein the first operating environment is a manufacturer domain used by an aircraft manufacturer, and wherein the second operating environment is an operator domain used by an aircraft operator selected from the group consisting of an airline, a military unit, and a government organization.

7. The apparatus of claim 1, wherein the single data processing device is a portable aircraft maintenance device.

8. A method for accessing an aircraft network data processing system on an aircraft, the method comprising:
    accessing the aircraft network data processing system by a first operating environment on a single data processing device connected to the aircraft network data processing system, wherein the first operating environment comprises a first logical partition comprising an operating system;
    requesting access to the aircraft network data processing system by a second operating environment on the single data processing device, wherein the second operating environment comprises a second logical partition comprising a virtual machine and wherein a separation between the first operating environment and the second operating environment prevents the second operating environment from affecting the aircraft except when controlled by a network access controller on the first operating environment; and
    controlling, by the network access controller on the first operating environment, the access to the aircraft network data processing system by the second operating environment based on rules defining the access to the aircraft network data processing system.

9. The method of claim 8, wherein the rules defining the access to the aircraft network data processing system are provided by a manufacturer of the aircraft.

10. The method of claim 8 further comprising:
    requesting access to an other network by the second operating environment;
    accessing the other network by the first operating environment; and
    controlling, by the network access controller on the first operating environment, the access to the other network by the second operating environment based on rules defining the access to the other network.

11. The method of claim 10, wherein the rules defining the access to the other network include rules provided by a manufacturer of the aircraft and rules provided by an other operator of the aircraft different from the manufacturer of the aircraft.

12. The method of claim 8 further comprising:
    identifying, by the network access controller, the aircraft to which the single data processing device is connected; and
    selecting, by the network access controller, the rules defining the access to the aircraft network data processing system based on an identity of the aircraft to which the single data processing device is connected.

13. The method of claim 8 further comprising providing, by the first operating environment, information regarding a configuration of software on the first operating environment to the aircraft network data processing system to identify the single data processing device as a first device that is allowed to connect to the aircraft network data processing system, wherein the first operating environment is a manufacturer domain used by an aircraft manufacturer, and wherein the second operating environment is an operator domain used by an aircraft operator selected from the group consisting of an airline, a military unit, and a government organization.

14. The method of claim 8, wherein the single data processing device is a portable aircraft maintenance device.

15. A method for changing software on a single data processing device, the method comprising:
    identifying, by a first operating environment on the single data processing device, update software in a designated location for the update software in a second operating environment on the single data processing device, wherein the first operating environment comprises a first logical partition, wherein the second operating environment comprises a second logical partition, and wherein a separation between the first operating environment and the second operating environment prevents the second operating environment from affecting an aircraft except when controlled by a network access controller; and
    changing, by the first operating environment, the software in the first operating environment using the update software in response to identifying the update software in the second operating environment.

16. The method of claim 15 further comprising:
    loading the update software in the designated location in the second operating environment;
    rebooting the single data processing device after loading the update software in the second operating environment; and
    identifying, by the first operating environment, the update software in the designated location in response to rebooting the single data processing device.

17. The method of claim 15 further comprising:
    connecting the single data processing device to an aircraft network data processing system on the aircraft;
    accessing the aircraft network data processing system by the first operating environment;
    requesting access to the aircraft network data processing system by the second operating environment, wherein the network access controller is on the first operating environment; and
    controlling, by the network access controller on the first operating environment, the access to the aircraft network data processing system by the second operating environment based on rules defining the access to the aircraft network data processing system.

18. The method of claim 17 further comprising providing, by the first operating environment, information regarding a configuration of the software in the first operating environment to the aircraft network data processing system to identify the single data processing device as a first device that is allowed to connect to the aircraft network data processing system, wherein the single data processing device is a single portable data processing device, wherein the first logical partition comprises an operating system, and wherein the second logical partition comprises a virtual machine.

19. The method of claim 15, wherein the single data processing device is a portable aircraft maintenance device.

20. The method of claim 15, wherein the first operating environment is a manufacturer domain used by an aircraft manufacturer, and wherein the second operating environment is an operator domain used by an aircraft operator selected from the group consisting of an airline, a military unit, a government organization, a private organization, and an aircraft maintenance entity.

* * * * *